Patented Dec. 25, 1934

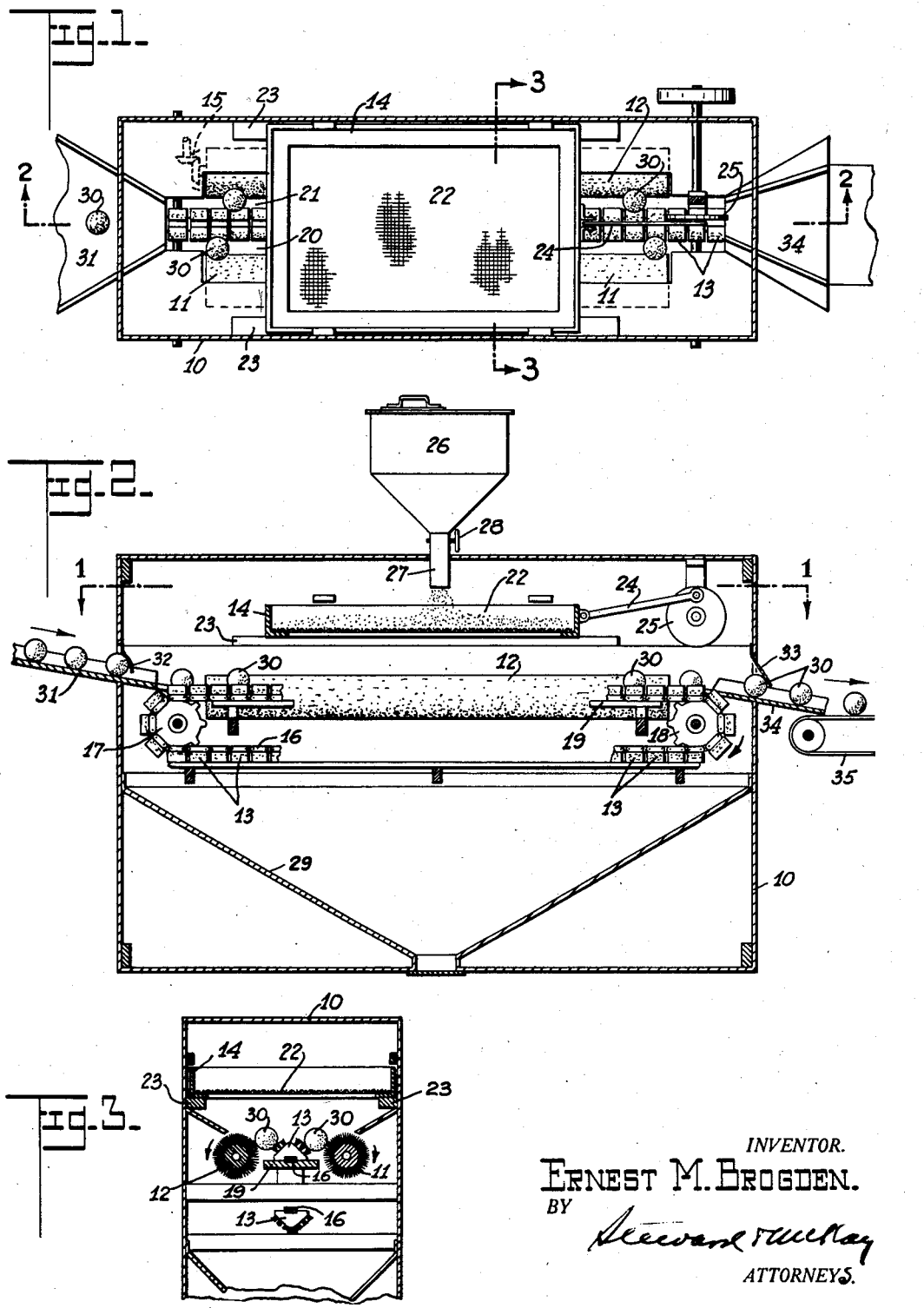

1,985,238

UNITED STATES PATENT OFFICE 1,985,238

TREATMENT OF FRESH FRUIT IN PREPARATION FOR MARKET

Ernest M. Brogden, Pomona, Calif., assignor to Brogdex Company, Winter Haven, Fla., a corporation of Florida Application January 19, 1932, Serial No. 587,593

9 Claims. (Cl. 91—68)

This invention relates to treatment of fresh fruit in preparation for market; and it relates more particularly to a process of applying to fresh citrus and other fruits a coating of substantially water-insoluble coating material by rubbing the surface of each fruit thoroughly with a small quantity of such coating material in finely divided or pulverulent condition, the quantity of coating material thus applied being insufficient to effect such complete sealing of the fruit rind or skin as would unduly interfere with the so-called transpiration of the fruit, but being sufficient to improve its keeping qualities and appearance.

During recent years it has become widespread practice among packers of citrus and other kinds of fresh fruit to provide such fruit with a very thin film coating of suitable protective material, such as paraffin, or mixtures of paraffin with harder waxy materials such as carnauba wax. The purpose of this has been to reduce the rate of shrinkage or withering which the fruit would otherwise normally undergo during the period elapsing between its removal from the tree and its purchase by the ultimate consumer, and otherwise to enhance its salability. In particular, the application of paraffin, or of paraffin-carnauba wax mixtures, to fruit by atomizing or fogging the waxy material in hot molten condition into contact with the fruit, and distributing it uniformly over the surface of the fruit with the aid of rapidly revolving brushes while maintaining the fruit in a heated environment, has proved by far the most effective and commercially practicable method yet developed. This method has gone into use on an enormous scale, having been employed in the treatment of many millions of boxes of fresh fruit. By this procedure, especially when a relatively high melting wax such as carnauba constitutes a part of the waxy composition employed, not only has the fruit been endowed in high degree with resistance to withering or shrinkage through loss of moisture content by evaporation, but in addition the surface of the fruit has been given an excellent luster or polish rendering it highly attractive to the trade in both wholesale and retail markets with the result that the fruit sells at a materially better price by reason of this fact and also because it remains plump and unshriveled.

In this well-known method of treating fruit above referred to, the employment of heat has been a very essential and even indispensable factor in obtaining thoroughly satisfactory results in commercial practice. The employment of heat necessarily increases the cost of operation, besides introducing complications which in practice necessitate keeping the procedure under close supervision of skilled operators. Thus, in order to handle rapidly and yet safely the enormous volume of fruit to be treated daily in the usual modern citrus packing house, for example, each fruit must be subjected to just the proper amount of heat for the necessary length of time, and must get just the right amount and character of coating. Hence it is vital to control the operating conditions, especially temperature, with considerable exactness if best results are to be obtained; and such control requires considerable skill and experience.

Attempts have been made heretofore to devise ways of applying protective coatings which will be of a satisfactory nature and yet will not require the employment of heat in effecting their application. None of these proposals has proved altogether satisfactory and some of them are actually injurious to the fruit. One method that involves the use of a mixture of paraffin wax with a solvent has given reasonably good results from the standpoint of reducing withering or shriveling of the fruit, but it leaves the fruit with a relatively dull lusterless appearance which renders it unattractive to buyers in the market and therefore tends to reduce its price and decrease substantially the net returns to the growers and shippers. Another scheme, which has been tried to some extent but which, in spite of much persistent effort, has been notably unsatisfactory, involves passing the fruit over rotary brush roll polishers of various designs, while pressing slabs or cakes of solid paraffin wax upwardly against the under surfaces of the rotating brush rolls. In this procedure, it is intended that the bristles of the rotary brush rolls, which are often relatively stiff fiber bristles, shall take up a certain amount of paraffin from the paraffin slabs pressed against them from below, and then shall wipe this paraffin over the surface of the fruit as it travels over the brush rolls. Experience has shown that this procedure is quite incapable of giving satisfactory results in commercial practice. In order to get even a relatively small and actually insufficient quantity of paraffin on the fruit by this method, the fruit has to be subjected to such vigorous and long continued brushing that rupture of oil cells in the rind and other surface injuries to the fruit are caused. Also, no properly uniform coating is produced by this method, and little or no protection against withering or shrinkage is realized. Moreover, the tips of the brush bristles soon become encased in tenaciously adherent hard paraffin which renders the brushes extremely harsh in their action and also practically useless as polishing members. Consequently, not only does the treatment fail to retard withering or shrinkage to any appreciable extent or produce a satisfactory polish on the fruit, but in addition the fruit is generally seriously damaged, rendered far more susceptible to decay, and in general lessened in value because of its obviously poor condition upon arrival at marketing centers.

One of the objects of the present invention is to provide a procedure for the application of a protective coating to fresh fruit which shall not require employment of heat but which shall avoid the disadvantages above stated, and which shall render it possible to attain protective coatings that are effective and satisfactory not only as regards retardation of withering or shinkage but also as regards getting a good luster or polish on the treated fruit. Another object of the invention is to provide a procedure which, besides enabling the use of heat to be dispensed with, shall also involve wholly novel features offering new and unexpected advantages of importance in the art of protectively treating fresh fruit in preparation for market.

With the attainment of these and other objects and advantages in view, as will appear more fully hereinafter, the invention comprises the novel procedure and steps thereof which will first be described in connection with certain typical practical embodiments illustrative of the underlying broad principles involved and will then be more particularly pointed out in the appended claims.

Speaking generally, the objects of the invention are achieved by applying to the surface of the fruit to be treated a coating material in solid form but in finely divided or powdered condition, and distributing the material smoothly and uniformly over the surface of the fruit by thorough rubbing or brushing. The coating material should, in general, be substantially water-insoluble, non-injurious to the skin or rind of the fruit, non-toxic, and capable of adhering firmly to the surface of the fruit and of exerting a limited sealing action thereon when applied in the manner herein disclosed. Most advantageously it should also be capable, when thus applied, of producing a good polish or luster on the fruit. Although the invention is thus not limited to the employment of any specific coating material, waxy material is best adapted for the purposes in view and is generally to be recommended for use in actual practice. Carnauba wax, either alone or compounded with paraffin wax, and especially carnauba wax alone, is at present considered most suitable for use in the new process. In further explaining the principles of the invention by way of a concrete illustrative example, the use of a waxy coating material consisting of or comprising carnauba wax will therefore be more particularly referred to without, however, implying limitation of the invention thereto.

In a particularly desirable practical embodiment of the novel process, an ordinary commercial grade of carnauba wax, melting at 180° to 184° F. or thereabouts, is employed in finely powdered or dust-like condition. For best results, it is desirable that most of an average sample of the powdered wax should pass a 100-mesh sieve, while a considerable proportion of it should desirably pass 200-mesh. The more finely the coating material is ground or otherwise pulverized, the better. A state of substantially impalpable fineness is ideal for the purposes here in view. A small quantity of the finely powdered carnauba wax is initially applied in any suitable manner effective to ensure dusting therewith the surface of each fruit (e. g. orange or grapefruit) to be treated, and the fruit so dusted is subjected, at ordinary atmospheric temperature, to a thorough rubbing or brushing by appropriate mechanical means to spread the powdered wax uniformly over the surface of the fruit, and to ensure its close or firm adherence thereto, as a protective film of extreme thinness. The fine dust-like particles, although substantially non-tacky, that is, no more tacky or sticky than the mass or body of hard wax from which they have been previously produced by grinding or other suitable pulverizing treatment, nevertheless appear to blend together to a substantial extent and become intimately associated with and fixed upon the fruit rind. The rubbing or brushing should desirably be continued long enough to produce also a good luster or polish on the fruit since this, as well as retardation of shriveling or shrinkage, is a matter of great importance from the standpoint of the trade and is one of the important objects sought and attained by the present invention. The amount of the coating material remaining on each fruit is actually very small, so little indeed as to be practically imperceptible to the average eye. In typical instances, the amount is on the order of approximately 3 to 6 pounds per California carload of 462 standard boxes or crates (over 75,000 oranges, for example, on the average). Although always small, the quantity will vary somewhat depending upon the details of procedure followed, and therefore the figures given are to be understood as only illustrative.

When applied in the manner described, the very fine dust-like particles of wax find their way into the surface porosities of the rind or skin in the manner indicated; and, while not completely sealing the rind or rendering it wholly impermeable to the passage therethrough of gases incidental to what is known as transpiration, the material so distributed is found to reduce substantially the rate of withering or shriveling which would otherwise be normal to the fruit. Also, notwithstanding the relatively high softening and melting points of carnauba wax and the fact that heating is not resorted to, it is found that when the wax thus finely powdered is thoroughly rubbed over the surface of the fruit, the small quantity adhering is nevertheless acted upon in its dust-like condition by the rotating brushes in such a way that the extremely thin coating or film produced is nevertheless practically continuous and uniform, and an excellent luster or polish is also obtained. Moreover, this satisfactory result is attainable merely by comparatively gentle, although thorough, rubbing of the fruit with soft horsehair brushes, in contrast to the drastic and harmfully severe brushing heretofore found indispensable to attain even the meager and unsatisfactory results characterizing prior attempts to apply waxy coatings to fruit without the aid of either heat or a softening solvent.

In practice, application of the powdered wax initially to the fruit to be treated may be accomplished in any of numerous suitable ways and by the use of widely differing specific types of applying apparatus. One desirable practical method is to sift or sprinkle the powder on the fruit either before it reaches the rubbing or brushing mechanism or while it is passing therethrough, or at both stages. Another method is to dust the powdered wax upon the surface of the fruit by blowing or otherwise projecting the powder into contact therewith. Or the wax powder may be blown or otherwise projected into contact with the mechanical rubbing or brushing elements over which the fruit passes. Whatever specific means be employed, it is highly advantageous to maintain continuously a quantity of the wax dust or powder floating or suspended in an enclosed space or chamber through which the fruit is made to pass while being turned over and over, the wax powder being thus easily brought into contact with every point of the fruit surface. At the same time, or subsequently, the fruit should be thoroughly rubbed or brushed. Most advantageously the aforesaid enclosed chamber may be associated directly with the rubbing or brushing mechanism whereby the fruit, while it is being acted upon for a predetermined period of time by the rotary brushing elements, is continuously maintained in the fog or cloud of suspended minute particles of completely solid wax. Under such conditions the desired thickness of protective film coating is gradually built up as successive lots of the minute wax particles contact with and adhere to the fruit, and are successively worked down by the action of the brushing surfaces into a finished coating of great uniformity. Moreover, because it is applied, in the best embodiments of the invention, substantially at prevailing atmospheric temperature and without the aid of a solvent, the coating is not subsequently subjected to the disturbing effect either of extensive cooling or of solvent evaporation; hence integrity of the film coating and tenacious adherence thereof to the fruit surface are favored in maximum degree.

The air-suspension of powdered wax within the chamber may be maintained either by suitable operation of any of the means above mentioned for applying the wax dust or powder to the fruit or in any other convenient manner as, for example, by means of mechanical agitator elements located within the chamber and operating to throw quantities of the wax powder upwardly into the enclosed space at a rate regulable at will by the operator. These are merely typical of various types of means that can be employed in practicing the process of the invention. Such apparatus is believed also to be novel in the art.

The accompanying drawing illustrates more or less diagrammatically one satisfactory form of apparatus which may be employed in practicing the novel process in one of its desirable practical embodiments wherein powdered coating material is sifted or sprinkled into the upper part of an enclosed space or chamber wherein fresh fruit is being rubbed or brushed. In the drawing, Fig. 1 is a plan view of the apparatus with the upper part of its enclosing housing removed, parts being shown in section on the line 1—1 of Fig. 2;

Fig. 2 is a vertical section on the line 2—2 of Fig. 1, parts being shown in side elevation; and Fig. 3 is a vertical cross-section, on a smaller scale, on the line 3—3 of Fig. 1.

In the particular form of apparatus here illustrated, a housing 10 encloses a chamber containing a polisher unit having brushing members 11, 12, 13, above which unit is mounted a cooperating sifting device 14, adapted and arranged to sift finely divided solid coating material downwardly into the upper part of the chamber and into contact with the brushing elements of the polisher unit and with fruit passing therethrough. Brushing members 11 and 12 of the polisher unit are rotary cylindrical brush rolls arranged horizontally in parallel and carried by suitable bearing for rotation, in the angular directions indicated by the arrows in Fig. 3, by driving means (not shown) acting through gearing 15. Brushing members 13, of which there are a considerable number, as shown, are generally triangular in cross-section (Fig. 3) and are carried and flexibly connected together by an endless chain 16, trained around sprockets 17, 18, thus forming an endless chain of brushing elements, the upper run of which is supported between brush rolls 11, 12, by a stationary horizontal track or guide 19, the oppositely sloping brush faces of this upper run thus cooperating with the respectively adjacent brush rolls to provide two fruit runways indicated generally at 20, 21. Upon said supporting track said upper run moves longitudinally between the brush rolls in the direction indicated by the arrow in Fig. 1, thereby advancing fruit through the polisher; sprocket 18 being appropriately driven to effect such movement at a speed adjustable to determine and control the rate at which fruit is to travel through the polisher unit and hence the length of time it is to be subjected to brushing. All the brushing surfaces are of sufficiently soft bristles, such as horsehair, to ensure avoidance of injury to the fruit.

The sifting device 14, which has a perforate bottom 22, made of metal screen for example, is slidable on a support 23 and is arranged to be given an oscillatory movement thereon through a connection 24 to crank disc 25, which is driven by suitable means (not shown) at a rate of speed adjustable to control the rate of oscillation of the sifter and thus to regulate the rate at which coating material is sifted downwardly toward the polisher. This is also governed in part by the size of the screen mesh which is usually quite fine. A container 26 for powdered coating material may be mounted outside the housing at a location above the sifter and the coating may be supplied therefrom to the sifter 14, either continuously or intermittently, in the quantity desired through supply pipe 27 having a control valve 28. A pan 29 is provided below the polisher unit to collect such surplus coating material as may find its way below the brushing mechanism and settle. From time to time, the contents of the collecting pan may be transferred to container 26 for re-use.

In employing the apparatus for the practice of the present process, the fruit 30 to be treated is fed to the polisher over delivery board 31, entering the chamber through an opening in the housing provided with a flexible closure flap 32, of canvas or the like. Ordinarily this fruit will have been previously washed and surface-dried according to known methods, and comes directly from the drier (not shown). A suitable quantity of finely powdered coating material, sufficient to maintain a considerable excess in the chamber at all times, is sifted down from the oscillating sifter 14. This material reaches the polisher brush members and the fruit thereon more or less rapidly depending upon its degree of fineness. But in any case, after the apparatus has been operating for a short time, the brushes carry an ample supply, and practically the entire enclosed space surrounding them is filled with a cloud or fog of dust-like particles of the coating material suspended in the air. Continuous maintenance of this air-suspension is materially added by the action of the rapidly rotating cylindrical brush rolls which constantly throw surplus powdered material off into the enclosed space and, in addition, create air-currents which circulate through the chamber and aid in floating the powdered material more or less uniformly into contact with the fruit, which turns over and over on varying axes while it is being brushed and constantly picks up additional minute quantities of the coating material in progressing through the polisher. The fruit finally leaves the polisher, as shown, through an exit opening in the housing provided with a flexible closure flap 33, passing over delivery board 34, and thence to suitable conveyor means 35 for subsequent grading, sizing and packing for shipment.

In operating in accordance with the present process, no difficulty is encountered from the brush bristles loading up with adherent coating material and becoming harsh and injurious in their action on the fruit. Any tendency in this direction is especially minimized where a coating material of relatively high melting point, such as powdered carnauba wax, or powdered mixtures of carnauba wax and paraffin wax blended (as by melting together) in various proportions to give a blend of substantially higher melting point than paraffin, is employed. Continuously maintaining the air-suspension of powdered coating material adjacent the polisher brushes as the fruit passes through the polisher and is thoroughly rubbed or brushed is particularly advantageous, since it affords repeated opportunity for the surface of the fruit to contact with and take up dust-like particles of the coating material throughout the duration of the rubbing treatment, the desired protective film coating being thus gradually built up as the solid particles of coating material are deposited on the fruit surface and uniformly distributed thereover and spread out by the action of the brushes. It is usually advantageous to have the duration of the brushing of substantial length, usually at least from 5 to 10 seconds, and from 15 to 25 seconds is sometimes to be recommended. The desired duration of the brushing period can be attained by using sufficiently long rotary brush rolls, in using the particular type of apparatus here illustrated, and by proper regulation of the rate of speed at which the endless chain of brush members 13 is moved.

Although powdered carnauba wax, or a relatively brittle and high melting mixture of carnauba wax with a softer wax, such as paraffin wax, is recommended for attaining best results, other solid coating materials of suitable character, non-injurious to fruit and capable of being reduced to a fairly finely powdered condition, may be employed in a similar manner. But, generally speaking, harder or more brittle and higher melting waxy materials are easier to reduce to powdered condition than is the ordinary grade of paraffin wax, and hence are more practical to employ as a general rule. Hard varnish gums which can be readily reduced to powdered condition are another type of sealing material that can be utilized. Likewise vegetable or animal fats or oils that have been sufficiently hardened by hydrogenation, for example, to be finely pulverized, can be made use of upon occasion. All such materials are intended to be comprised within the generic designation of substantially water-insoluble coating material non-injurious to the surface of fresh fruit and reducible to powdered condition.

What is claimed is:

1. In the preparation of fresh fruit for market, the process which comprises applying to the surface of fresh fruit a substantially water-insoluble finely pulverulent coating material which is non-injurious thereto, said pulverulent material being completely solid and substantially non-tacky, and rubbing the fruit to distribute said material uniformly over the surface of the fruit and cause it to adhere firmly thereto, said material being employed in quantity insufficient to seal completely the surface of the fruit.

2. In the preparation of fresh fruit for market, the process which comprises rubbing powdered waxy material which is completely solid and substantially non-tacky upon the surface of fresh fruit.

3. In the preparation of fresh fruit for market, the process which comprises rubbing powdered carnauba wax which is completely solid and substantially non-tacky upon the surface of fresh fruit.

4. In the preparation of fresh fruit for market, the process which comprises contacting the surface of fresh fruit with powdered waxy material which is completely solid and substantially non-tacky and rubbing the fruit without application of heat until a small quantity of said waxy material is distributed smoothly over the surface of the fruit and adheres thereto.

5. In the preparation of fresh fruit for market, the process which comprises providing a supply of powdered coating material which is completely solid and substantially non-tacky, sifting said material into contact with fresh fruit, and rubbing the fruit until a small quantity of said coating material is distributed smoothly over the surface of the fruit and adheres thereto.

6. In the preparation of fresh fruit for market, the process which comprises providing a supply of powdered waxy material which is completely solid and substantially non-tacky, sifting said material into contact with fresh fruit, and rubbing the fruit until a small quantity of said waxy material is distributed smoothly over the surface of the fruit and adheres thereto.

7. In the preparation of fresh fruit for market, the process which comprises providing a supply of powdered coating material which is completely solid and substantial non-tacky, maintaining in an enclosed chamber a suspension of said powdered coating material in air substantially at prevailing atmospheric temperature, passing fresh fruit through said chamber, and rubbing said fruit thoroughly.

8. In the preparation of fresh fruit for market, the process which comprises providing a supply of powdered waxy material which is completely solid and substantially non-tacky, maintaining in an enclosed chamber a suspension of said powdered waxy material, comprising carnauba wax, in air substantially at prevailing atmospheric temperature, passing fresh fruit through said chamber, and rubbing said fruit thoroughly.

9. In the preparation of fresh fruit for market, the process which comprises dusting powdered carnauba wax which is completely solid and substantially non-tacky, on fresh citrus fruit and brushing said fruit until a small quantity of the wax is distributed in a thin adherent coating over the surface of the fruit.

ERNEST M. BROGDEN.